(12) United States Patent
Koike et al.

(10) Patent No.: US 11,809,944 B2
(45) Date of Patent: Nov. 7, 2023

(54) DATA WRITING DEVICE

(71) Applicant: TOSHIBA TEC KABUSHIKI KAISHA, Tokyo (JP)

(72) Inventors: Yuki Koike, Sunto Shizuoka (JP); Sadatoshi Oishi, Fuji Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 492 days.

(21) Appl. No.: 17/142,150

(22) Filed: Jan. 5, 2021

(65) Prior Publication Data
US 2021/0122169 A1    Apr. 29, 2021

Related U.S. Application Data

(63) Continuation of application No. 16/254,358, filed on Jan. 22, 2019, now Pat. No. 10,906,328.

(30) Foreign Application Priority Data

Feb. 1, 2018    (JP) .................................. 2018-016619

(51) Int. Cl.
*H04W 4/80*     (2018.01)
*G06K 7/10*     (2006.01)
(Continued)

(52) U.S. Cl.
CPC ........ *G06K 7/10445* (2013.01); *B41J 3/4075* (2013.01); *B41J 3/50* (2013.01); *B41J 11/46* (2013.01); *G06K 17/0025* (2013.01)

(58) Field of Classification Search
CPC ........... G06K 7/10445; G06K 17/0025; G06K 7/10178; B41J 3/4075; B41J 3/50; B41J 11/46
(Continued)

(56) References Cited

U.S. PATENT DOCUMENTS

2008/0240828 A1*  10/2008  Toda ..................... B41J 11/485
                                                                400/76
2010/0245058 A1*  9/2010   Kojima ................. B41J 3/4075
                                                                340/10.52
(Continued)

FOREIGN PATENT DOCUMENTS

| JP | 2003-178271 A | 6/2003 |
| JP | 2007-164426 A | 6/2007 |
| JP | 2013-020502 A | 1/2013 |

OTHER PUBLICATIONS

Notice of Reasons for Refusal dated Jul. 13, 2021 in corresponding Japanese Patent Application No. 2018-016619, 12 pages (with Translation).

*Primary Examiner* — Tanmay K Shah
(74) *Attorney, Agent, or Firm* — Kim & Stewart LLP (57) ABSTRACT

A data writing device includes a roller configured to convey a label including a radio tag along a predetermined path, a reader/writer configured to wirelessly communicate with the radio tag, and a controller configured to control the roller to convey the label and control the reader/writer to acquire a plurality of radio wave intensities from the radio tag at different positions along the predetermined path as the label is conveyed, and determine one of the different positions along the predetermined path at which the radio wave intensities are equal to or greater than a threshold value as a writing position for the radio tag.

20 Claims, 7 Drawing Sheets

(51) Int. Cl.
  *B41J 3/50*    (2006.01)
  *B41J 3/407*   (2006.01)
  *G06K 17/00*   (2006.01)
  *B41J 11/46*   (2006.01)

(58) Field of Classification Search
  USPC .................................................. 340/10.42
  See application file for complete search history.

(56) References Cited

U.S. PATENT DOCUMENTS

2014/0035733 A1   2/2014  Yamamoto
2018/0165487 A1*  6/2018  Hori ..................... G06K 15/028

* cited by examiner

DATA WRITING DEVICE

CROSS-REFERENCE TO RELATED APPLICATIONS

This application is a continuation of U.S. patent application Ser. No. 16/254,358, filed Jan. 22, 2019, which is based upon and claims the benefit of priority from Japanese Patent Application No. 2018-016619, filed on Feb. 1, 2018 the entire contents of which are incorporated herein by reference.

FIELD

Embodiments described herein relate generally to a data writing device.

BACKGROUND

There is a data writing device for writing data into a radio tag such as a radio frequency identifier (RFID) tag. Such a data writing device conveys a label including the radio tag and writes data into the radio tag at a predetermined position.

However, in the related art, the data writing device is controlled to write the data at the predetermined position regardless of the actual intensity of the radio wave. Thus, in the data writing device of the related art, the data may be written into the radio tag at a position where the radio wave condition is not good.

DETAILED DESCRIPTION

An embodiment provides a data writing device capable of writing data at a position where the sensitivity of a radio wave from a radio tag is high.

In general, according to one embodiment, a data writing device includes a roller configured to convey a label including a radio tag along a predetermined path, a reader/writer configured to wirelessly communicate with the radio tag, and a controller configured to control the roller to convey the label and control the reader/writer to acquire a plurality of radio wave intensities from the radio tag at different positions along the predetermined path as the label is conveyed, and determine one of the different positions along the predetermined path at which the radio wave intensities are equal to or greater than a threshold value as a writing position for the radio tag.

Hereinafter, embodiments will be described in detail with reference to the drawings.

First Embodiment

First, a first embodiment will be described.

The data writing device according to the first embodiment stores data in a radio tag. For example, the data writing device stores a label including the radio tag. The data writing device conveys the label to a predetermined position and stores the data in the radio tag of the label. In addition, the data writing device stores predetermined data in the radio tag based on operation input by an operator or the like. In addition, the data writing device prints a predetermined image on the label. The data writing device conveys the label, on which the image is printed, and discharges the label to the outside.

Figure 1:
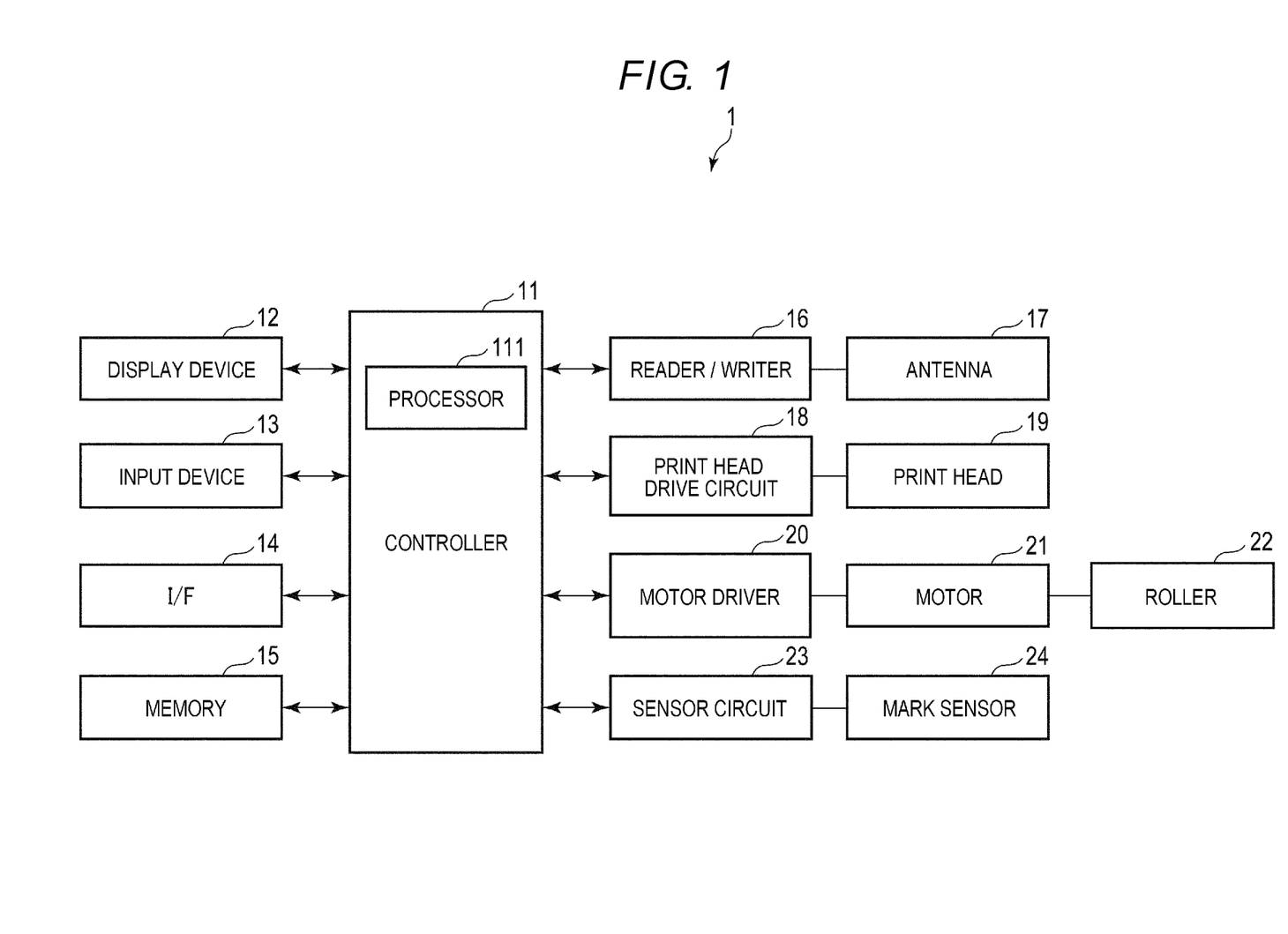
FIG. 1 is a block diagram showing a data writing device according to a first embodiment.

FIG. 1 is a block diagram showing the configuration example of a data writing device 1. As shown in FIG. 1, the data writing device 1 includes a controller 11, a display device 12, an input device 13, an interface 14, a memory 15, a reader/writer 16, an antenna 17, a print head drive circuit 18, a print head 19, a motor driver 20, a motor 21, a roller 22, a sensor circuit 23 and a mark sensor 24.

The controller 11, the display device 12, the input device 13, the interface 14, the memory 15, the reader/writer 16, the print head drive circuit 18, the motor driver 20 and the sensor circuit 23 are connected to one another through a data bus or the like.

The reader/writer 16 and the antenna 17 are electrically connected to each other. The print head drive circuit 18 and the print head 19 are electrically connected to each other. The motor driver 20 and the motor 21 are electrically connected to each other. The motor 21 and the roller 22 are physically connected. The sensor circuit 23 and the mark sensor 24 are electrically connected to each other.

In addition, the data writing device 1 may include other components in addition to the components shown in FIG. 1 as necessary or a specific component of the data writing device 1 may be excluded.

The controller 11 controls the entire data writing device 1. The controller 11 includes a processor 111 or the like.

The processor 111 controls operation of the controller 11. That is, the processor 111 controls the entire data writing device 1. The processor 111 may include an internal memory, various types of interfaces, and the like. The processor 111 performs various processes by executing a program pre-stored in the internal memory or the memory 15.

In addition, some of the various types of functions performed by the processor 111 may be realized by a hardware circuit. In this case, the processor 111 controls the function executed by the hardware circuit.

The display device 12 displays a variety of information by control of the processor 111. For example, the display device 12 includes a liquid crystal monitor.

The input device 13 receives input of various operations from the operator. The input device 13 transmits a signal indicating the received operation to the processor 111. For example, the input device 13 includes a keyboard, a numeric keypad and a touch panel. In addition, if the input device 13 includes the touch panel or the like, the input device may be formed integrally with the display device 12.

The interface 14 is an interface for transmitting or receiving data to or from an external device. For example, the interface 14 transmits or receives data to or from the external device through a network such as a local area network (LAN). The interface 14 may be an interface supporting USB connection.

The memory 15 is a rewritable non-volatile memory. The memory 15 is, for example, include, an SSD, an HDD or the like. In addition, the memory 15 may store a program executed by the processor 111, control data and the like.

The reader/writer 16 is a device for performing wireless communication with a radio tag 44 through the antenna 17. The reader/writer 16 reads identification information (for example, an electronic product code (EPC)) or the like of the radio tag 44 by a radio wave from the radio tag 44. In addition, the reader/writer 16 acquires the intensity of the radio wave from the radio tag 44. In addition, the reader/writer 16 stores predetermined data in the radio tag 44 based on a signal from the controller 11.

The antenna 17 allows the reader/writer 16 to perform wireless communication with the radio tag 44. For example, the antenna 17 is provided to be adjacent to a conveyance path, where the radio tag 44 is conveyed. In addition, the antenna 17 may be a directional antenna having directivity in the conveyance path.

The print head drive circuit 18 controls driving of the print head 19 according to a signal from the controller 11. For example, the print head drive circuit 18 transmits power or a control signal to the print head 19.

The print head 19 prints an image on a label 43 including the radio tag 44 based on control of the print head drive circuit 18. For example, the print head 19 includes an inkjet head for ejecting ink droplets. The print head 19 may print a monochrome image on the label 43 or print a color image on the label 43.

The motor driver 20 controls driving of the motor 21 according to a signal from the controller 11. For example, the motor driver 20 transmits power or a control signal to the motor 21.

The motor 21 drives the roller 22 based on control of the motor driver 20. For example, the motor 21 is a stepping motor or the like.

The roller 22 rotates by driving force from the motor 21. The roller 22 rotates to convey the label 43 in a predetermined direction.

The sensor circuit 23 controls driving of the mark sensor 24 according to a signal from the controller 11. For example, the sensor circuit 23 transmits power or a control signal to the mark sensor 24.

The mark sensor 24 reads a mark 45 formed on a label roll paper 41. The mark sensor 24 transmits a predetermined signal to the sensor circuit 23 when the mark 45 is read. For example, the mark sensor 24 is an optical sensor or the like.

Figure 2:
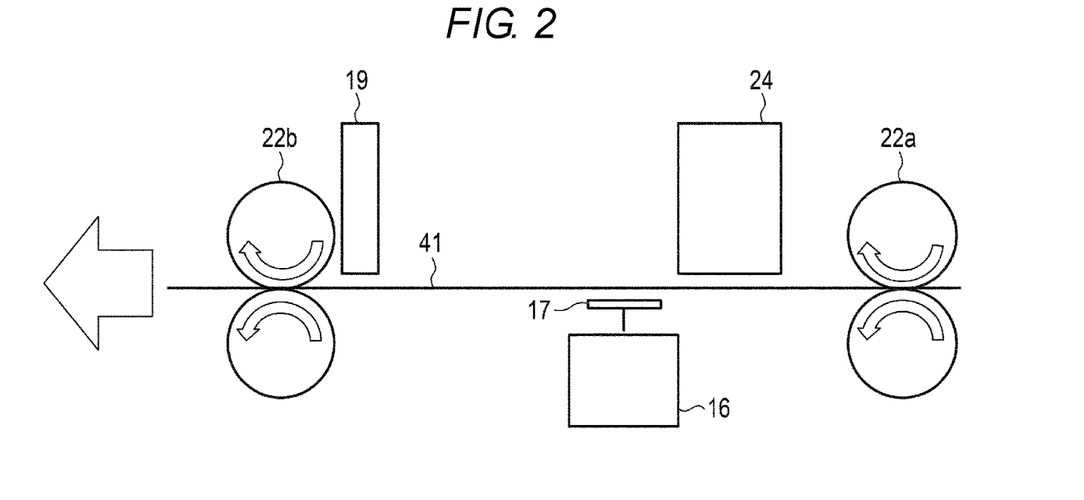
FIG. 2 is a view showing a print head according to the first embodiment.

FIG. 2 is a view showing a positional relationship of the antenna 17 and the like. As shown in FIG. 2, the roller 22 includes rollers 22a and 22b. The roller 22a and the roller 22b are formed at a predetermined interval. The label roll paper 41 is conveyed from the side of the roller 22a to the side of the roller 22b. Here, the side of the roller 22a is an upstream side and the side of the roller 22b is a downstream side.

The rollers 22a and 22b include two rollers for holding and conveying the label roll paper 41.

The mark sensor 24 is formed at the downstream side of the roller 22a. The mark sensor 24 detects the mark 45 on the back surface of the label roll paper 41.

The antenna 17 is formed at the downstream side of the mark sensor 24. The antenna 17 is formed at a position facing the mark sensor 24. That is, the antenna 17 is formed to be adjacent to the surface of the label roll paper 41.

The print head 19 is formed at the downstream side of the antenna 17. The print head 19 is formed to be in contact with the surface of the label roll paper 41. That is, the print head 19 forms an image on the surface of a label 43.

The roller 22b is formed at the downstream side of the print head 19.

Figure 3:
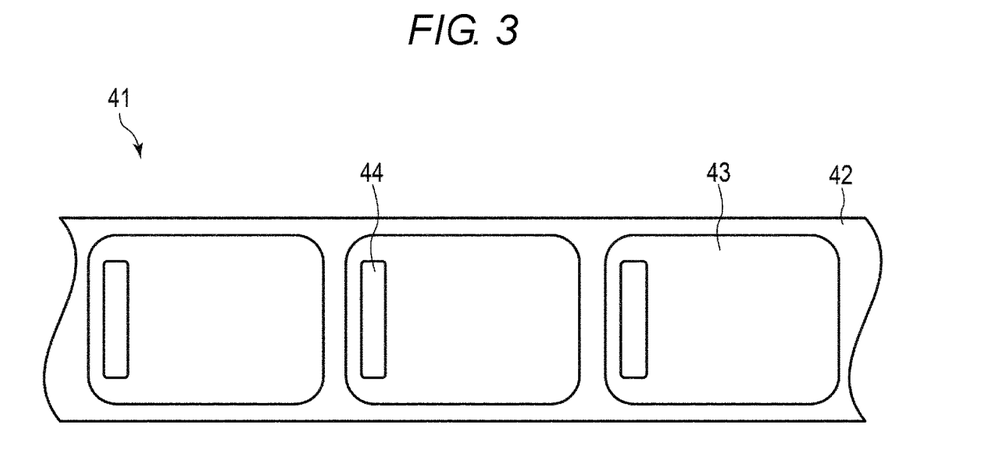
FIG. 3 is a view showing a label roll paper according to the first embodiment.
Figure 4:
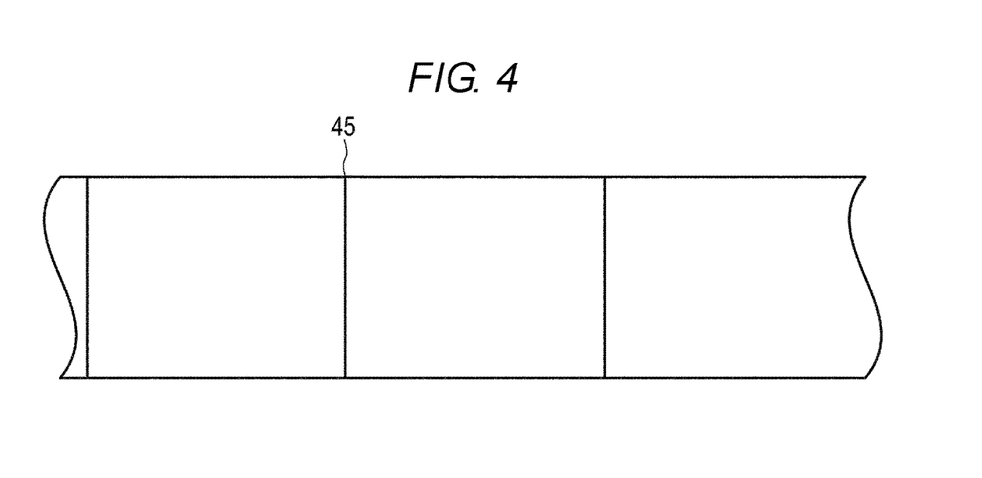
FIG. 4 is a view showing an example of the label roll paper.

Next, the label roll paper 41 will be described. FIG. 3 shows an example of the surface of the label roll paper 41. In addition, FIG. 4 shows an example of the back surface of the label roll paper 41.

The label roll paper 41 is a roll of label paper including a plurality of labels 43 in a row. The label roll paper 41 is formed to extend in parallel with the long side of the label 43.

The label roll paper 41 includes a mount 42 and a label 43.

The mount 42 supports the plurality of labels 43 at a predetermined interval in a row. For example, the mount 42 is partially connected to the label 43 to support the label 43. For example, the mount 42 includes a material such as plastic or vinyl.

The label 43 is a medium including the radio tag 44 therein. The label 43 is formed in a rectangular shape. The label 43 is formed by laminating a plurality of layers. The label 43 includes the radio tag 44 between the plurality of layers. For example, the label 43 includes a material such as paper, plastic or vinyl. The label 43 may include the same material as the mount 42 or may include a material different from that of the mount 42.

In addition, the label roll paper 41 includes the mark 45 on the back surface. The mark 45 is used by the data writing device 1 to recognize the position of the label 43. The mark 45 is attached to each label 43. Here, the mark 45 is attached to a start point of the label 43.

Figure 5:
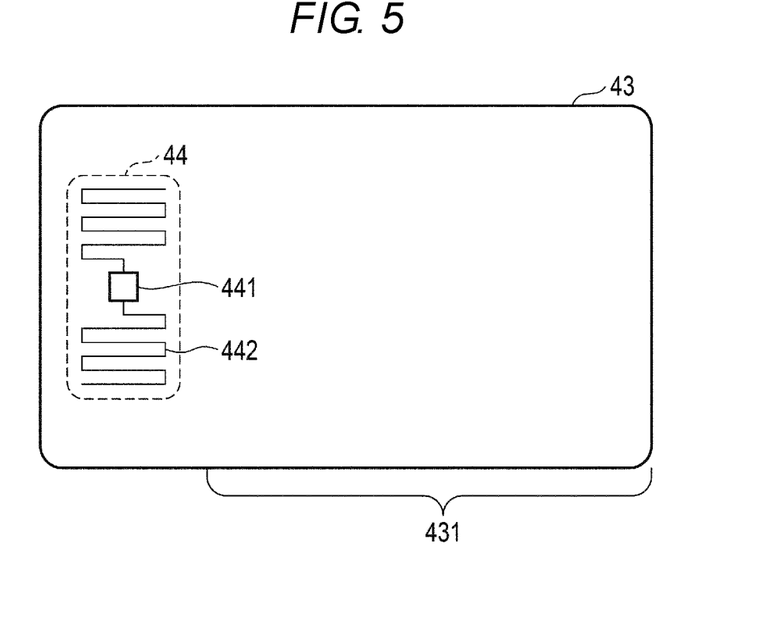
FIG. 5 is a view showing a label according to the first embodiment.

Next, the label 43 will be described. FIG. 5 shows an example of the label 43.

As shown in FIG. 5, the label 43 includes the radio tag 44, a print region 431 and the like. In addition, the label may include the other components in addition to the components shown in FIG. 5 as necessary or a specific component may be excluded.

The radio tag 44 is disposed at a predetermined position of the label 43. In the example shown in FIG. 5, the radio tag 44 is disposed on the left side of the label 43. In addition, the radio tag 44 may be disposed on the right side or the center of the label 43. The position where the radio tag 44 is disposed is not limited to a specific configuration.

The radio tag 44 is embedded between the plurality of layers configuring the label 43. In addition, at least one radio tag 44 is embedded into one label 43. The radio tag 44 is wirelessly written from an external device with predetermined data or wirelessly transmits predetermined data to the external device.

As shown in FIG. 5, the radio tag 44 includes a chip 441 and an antenna 442.

The chip 441 controls the entire radio tag 44. For example, the chip 441 includes a control unit, a memory, a communication interface and the like.

The control unit has a function for controlling overall operation of the chip 441. The control unit may include an internal cache memory, various types of interfaces, and the like. For example, the control unit performs various processes by data stored in the internal memory or the memory.

The control unit may include a processor and the like. In addition, the control unit may include hardware such as a sequencer.

The memory is a non-volatile memory in which data may be written. The memory stores a variety of data based on operation of the control unit. In addition, the memory may store data for preliminary control according to usage of the radio tag 44. In addition, the memory may temporarily store data which is being processed by the control unit. In addition, the memory may be a non-volatile memory in which data may be rewritten.

The communication interface is an interface for communicating with an external device through the antenna 442. The communication interface may include a power supply for supplying power received from the external device.

The antenna 442 is an antenna for wirelessly communicating with the external device. The antenna 442 is also used to receive power supplied from the external device. For example, the antenna 442 may be formed in a predetermined region in a mesh shape. In addition, the antenna 442 may be formed in a predetermined region in a circular shape.

The radio tag 44 is activated (e.g., becomes an operable state) by receiving power supplied from the external device in a non-contact manner. The radio tag 44 receives a radio wave from the external device through the antenna 442 as a communication interface and a modulation-demodulation circuit. The radio tag 44 generates and activates operation power and an operation clock by the power supply driven by the radio wave.

When the radio tag 44 is activated, the chip 441 can perform data communication with the external device through the antenna 442. For example, the chip 441 receives an access password or the like from such as the reader/writer 16 through the antenna 442 and establishes communication with the reader/writer 16. In addition, the chip 441 transmits and receives predetermined data to and from the reader/writer 16 through the antenna 442.

For example, the radio tag 44 is an RFID or the like. In addition, the configuration of the radio tag 44 is not limited to a specific configuration.

The print region 431 is a region where various images are printed by the print head 19. In addition, the print region 431 may include heat-sensitive paper or the like.

Next, the function realized by the data writing device 1 will be described. The function realized by the data writing device 1 is realized by executing the program stored in the internal memory or the memory 15 by the processor 111.

First, the processor 111 has a function for measuring the radio wave intensity from the radio tag 44 at a plurality of positions.

The processor 111 controls the motor driver 20 to drive the motor 21 to convey the label roll paper 41. The processor 111 waits until the mark sensor 24 detects the mark 45. When the mark sensor 24 detects the mark 45, the processor 111 controls the motor 21 to stop conveyance of the label roll paper 41. That is, the processor 111 sets the label 43 to an initial position.

When conveyance of the label roll paper 41 is stopped, the processor 111 controls the reader/writer 16 to transmit a predetermined signal to the radio tag 44. When the predetermined signal is transmitted, the processor 111 acquires the radio wave intensity of a response from the radio tag 44 using the reader/writer 16. In addition, the processor 111 acquires identification information of the radio tag 44 received through the reader/writer 16 as a response.

When the radio wave intensity is acquired, the processor 111 controls the motor driver 20 to drive the motor 21 and convey the label roll paper 41 (that is, the label 43) in a smallest movement unit S. When the label 43 is moved by S, the processor 111 controls the reader/writer 16 to transmit a predetermined signal to the radio tag 44. When the predetermined signal is transmitted, the processor 111 acquires the radio wave intensity of the response from the radio tag 44 using the reader/writer 16. The processor 111 repeats the above operation until the label 43 is moved by the width L of the radio tag 44. By the above operation, the processor 111 measures the radio wave intensity from the radio tag 44 at the plurality of positions in a conveyance direction.

In addition, the processor 111 excludes the radio wave intensity from an adjacent radio tag 44. For example, the processor 111 excludes the radio wave intensity from the adjacent radio tag 44 based on the identification information from the radio tag 44.

In addition, the processor 111 generates data for a graph of the measured positions and the radio wave intensities.

Figure 6:
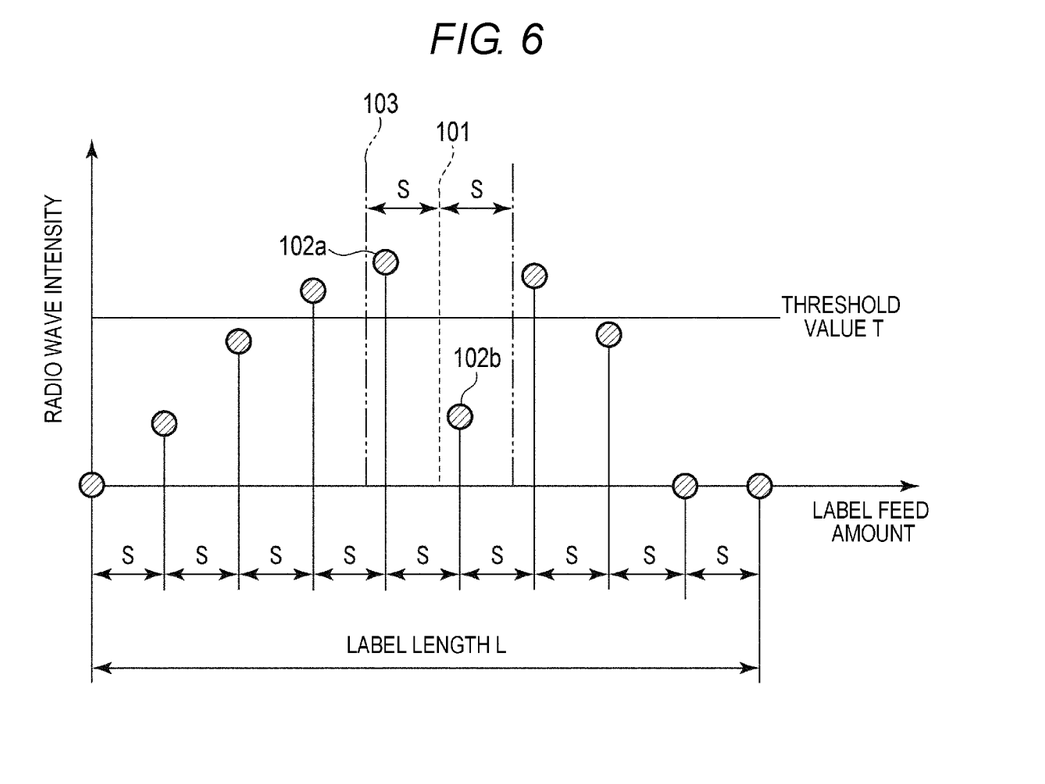
FIG. 6 is a graph of the intensity of a radio wave from a radio tag according to the first embodiment.

FIG. 6 shows an example of the graph. In the example shown in FIG. 6, a horizontal axis denotes the position of the label 43 (i.e., feed amount) and a vertical axis denotes the radio wave intensity. As shown in FIG. 6, an interval between plot points is S. In addition, the points are plotted within the length L of the label 43.

In addition, the processor 111 has a function for calculating the central point of a diagram drawn by the graph of the radio wave intensity, i.e., the diagram surrounded by the lines connecting the plot points and the axis line for the label feed amount. That is, in FIG. 6, the vertical line including the central point divides the diagram such that the divided portions have the same area.

In the example shown in FIG. 6, a line 101 denotes the vertical line including the central point. The line 101 divides the diagram such that the areas of the left and right side of the graph coincide with each other.

In addition, the processor 111 has a function for determining whether a point (drop point) where the radio wave intensity significantly drops with respect to the adjacent radio wave intensities is present in a predetermined range from the central point.

For example, the processor 111 determines whether a drop point is present in the range of S from the central point. That is, the processor 111 determines whether a drop point is present in the range of −S from the central point to +S from the central point.

In addition, the processor 111 determines a point where the radio wave intensity is less than a predetermined threshold value T as the drop point. For example, the threshold value T is the radio wave intensity, at which data can be stably written.

In the example shown in FIG. 6, the processor 111 finds a plot point 102a and a plot point 102b in the range of S from the central point. The processor 111 determines whether the radio wave intensities of the plot points 201a and 102b are less than the threshold value T. Here, the processor 111 determines that the radio wave intensity of the plot point 102b is less than the threshold value T.

In addition, the processor 111 has a function for setting a writing position based on the central point and the plot point less than the threshold value T (i.e., drop point).

The writing position is a position where the antenna 17 is in contact with the label 43 when the reader/writer 16 writes the data into the radio tag 44. Here, the writing position is a distance, by which the label 43 is conveyed from the initial position when the reader/writer 16 writes the data into the radio tag 44.

The processor 111 determines the writing position at a position separated from the central point by a predetermined distance in a direction opposed to the drop point. For example, the processor 111 sets the writing position at a position shifted from the central point by S in the opposite direction.

In the example shown in FIG. 6, the processor 111 sets the writing position at a point shifted from the central point (the line 101) by S in the direction opposed to the plot point 102b. That is, the processor 111 sets the writing position at the position denoted by a line 103.

In addition, the processor 111 sets the central point to the writing position when a drop point is not present in the range of S from the central point.

In addition, the processor 111 has a function for writing predetermined data into the radio tag 44 based on the set writing position.

The processor 111 controls the roller 22 to convey the label 43 such that the position of the antenna 17 coincides with the writing position. That is, the processor 111 controls the motor driver 20 to stop the motor 21 or the roller 22 when the label is conveyed to the writing position after the mark 45 is detected. If conveyance of the label 43 is stopped, the processor 11 controls the reader/writer 16 to write predetermined data in the radio tag 44 of the label 43. For example, the processor 111 controls the reader/writer 16 to transmit a predetermined writing command to the radio tag 44.

In addition, the processor 111 may control the reader/writer 16 to write predetermined data into the radio tag 44 at corresponding timing without stopping conveyance of the label 43.

In addition, the processor 11 has a function for printing a predetermined image in the print region 431 of the label 43.

The processor 111 drives the motor 21 to convey the label 43 to the print head 19. If the label 43 is conveyed, the processor 111 controls the print head drive circuit 18 and the print head 19 to print a predetermined image in the print region 431 of the label 43.

In addition, the processor 111 may control the roller 22 to discharge the label 43, where the predetermined image is printed, to the outside. For example, the processor 111 controls a cutter (not shown in the drawings) to detach the label 43 from the mount 42 and controls the roller 22 to convey the label to an outlet.

Next, the operation example of the data writing device 1 will be described.

Figure 7:
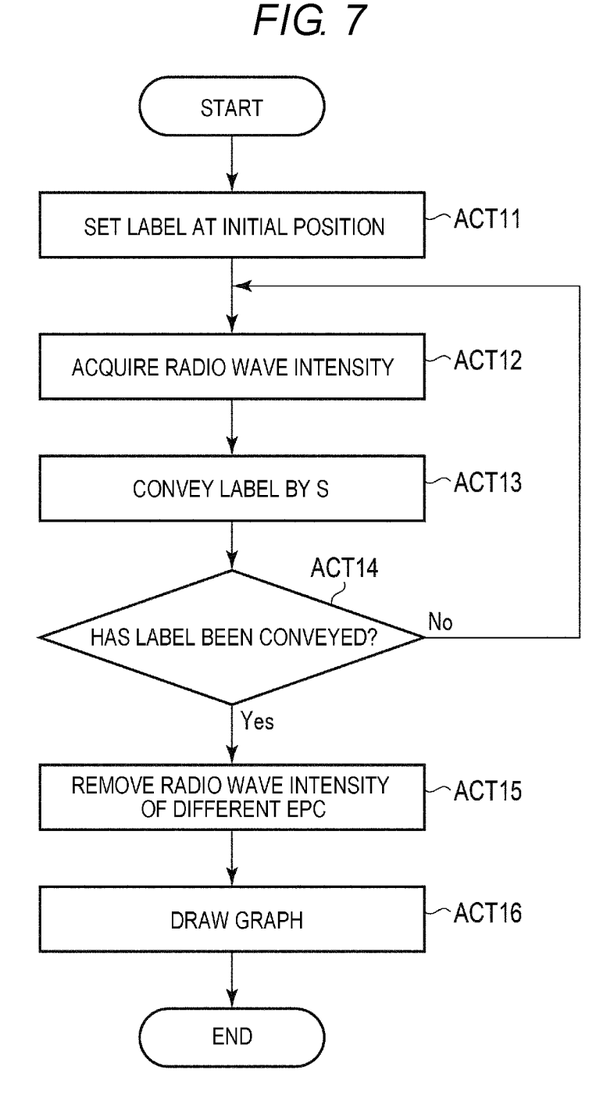
FIG. 7 is a flowchart of operation performed by the data writing device.

First, the operation example in which the data writing device 1 generates the graph will be described. FIG. 7 is a flowchart illustrating the operation example in which the data writing device 1 generates the graph.

First, the processor 111 controls the roller 22 to set the label 43 at the initial position (ACT 11), by detecting the mark 45 through the mark sensor 24. When the label 43 is set at the initial position, the processor 111 acquires the radio wave intensity from the radio tag 44 of the label 43 using the reader/writer 16 (ACT 12).

When the radio wave intensity is acquired, the processor 111 controls the roller 22 to convey the label 43 by S (ACT 13). When the label 43 is conveyed by S, the processor 111 determines whether the label 43 has been conveyed by the length L of the label 43 (ACT 14).

Upon determining that the label 43 has not been conveyed by the length L of the label 43 (ACT 14, NO), the processor 111 returns to ACT 12.

Upon determining that the label 43 has been conveyed by the length L of the label 43 (ACT 14, YES), the processor 111 removes the radio wave intensity of different identification information (ACT 15). When the radio wave intensity of the different identification information is removed, the processor 111 generates data for drawing the graph of the radio wave intensity (ACT 16).

When the data for the graph of the radio wave intensity is generated, the processor 111 ends operation.

Figure 8:
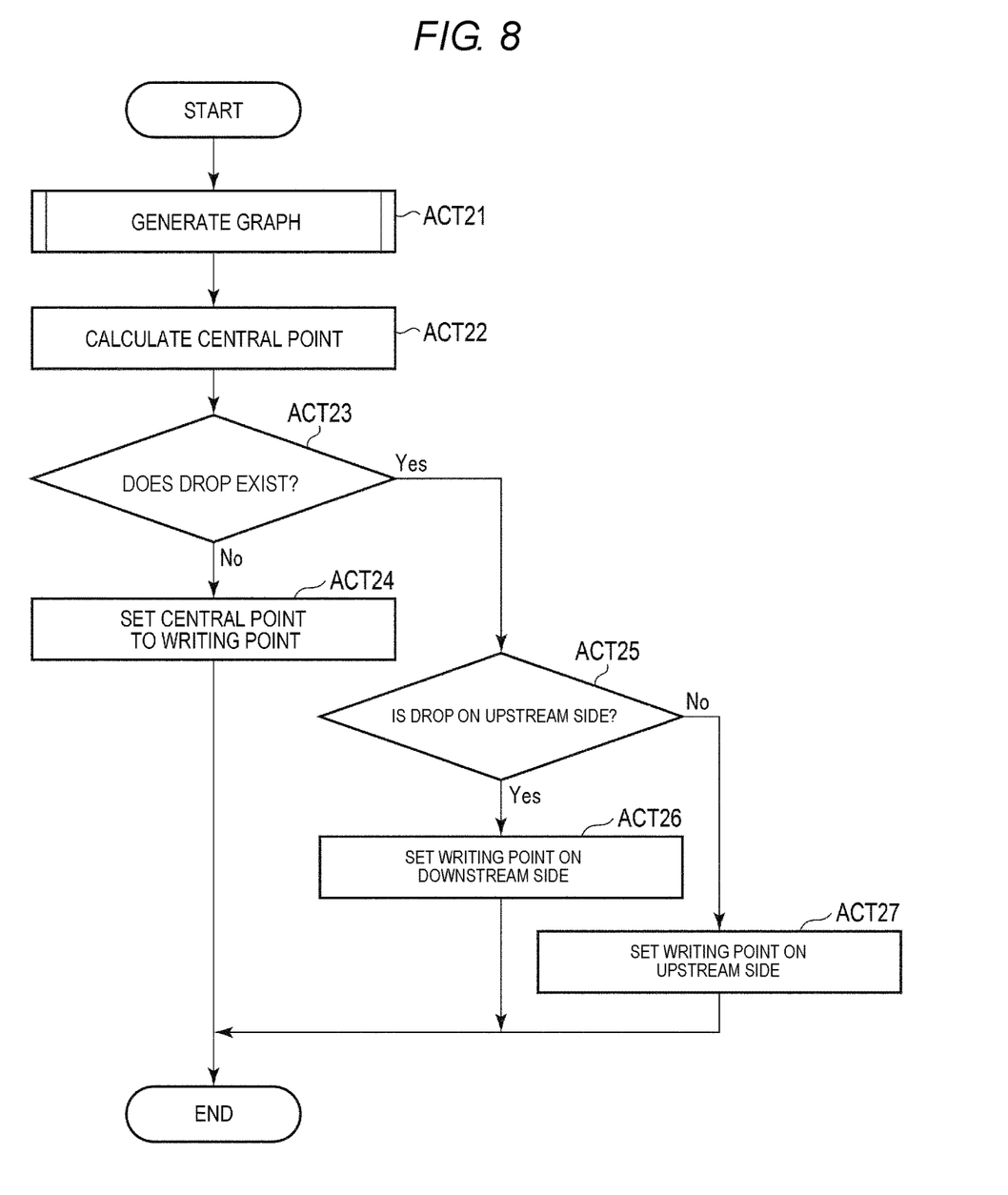
FIG. 8 is a flowchart of operation performed by the data writing device.

Next, the operation example in which the data writing device 1 sets the writing position will be described. FIG. 8 is a flowchart illustrating the operation example in which the data writing device 1 sets the writing position.

First, the processor 111 generates the data for the graph of the radio wave intensity (ACT 21). The operation example of generating the data for the graph of the radio wave intensity was described above. When the graph of the radio wave intensity is generated, the processor 111 calculates the central point based on the graph (ACT 22). When the central point is calculated, the processor 111 determines whether a drop point is present in the predetermined range from the central point (ACT 23).

Upon determining that the drop point is not present in the predetermined range from the central point (ACT 23, NO), the processor 111 sets the central point to the writing position (ACT 24).

Upon determining that the drop point is present in the predetermined range from the central point (ACT 23, YES), the processor 111 determines whether the drop point is at an upstream side of the central point (ACT 25). Upon determining that the drop point is at the upstream side of the central point (ACT 25, YES), the processor 111 sets the position separated from the central point by S in the downstream direction to the writing position (ACT 26).

Upon determining that the drop point is not at the upstream side of the central point (ACT 25, NO), the processor 111 sets the position separated from the central point by S in the upstream direction to the writing position (ACT 27).

If the central point is set to the writing position (ACT 24), if the writing position is set to the position separated from the central point by S in the downstream direction (ACT 26), or if the writing position is set to the position separated from the central point by S in the upstream direction (ACT 27), the processor 111 ends operation.

In addition, the processor 111 may control the roller 22 to convey the label 43 itself, instead of the label roll paper 41. For example, the processor 111 may control the roller 22 to take out the label 43 from a supply unit for storing a plurality of labels 43 and convey the label 43.

In addition, the processor 111 may control the print head 19 not to print an image on the label 43.

In addition, the processor 11 may control the roller 22 to return the label 43 to the upstream side when data is written into the radio tag 44.

In addition, the antenna 17 is movable. The processor 111 may control an antenna control mechanism (not shown) to move the antenna 17 to measure the radio wave intensity of each unit. In addition, the processor 111 may control the antenna control mechanism to move the antenna 17 to the writing position and store predetermined data in the radio tag 44.

The data writing device having the above configuration generates the data for the graph of the radio wave intensity and calculates the central point of the graph. In addition, the data writing device determines the writing position to a position avoiding a drop point, when a drop of the radio wave intensity is present in the predetermined range from the central point. As a result, the data writing device can set the writing position to a position where the radio wave intensity is high even when a drop of the radio wave intensity is present in the central portion of the label. Accordingly, the data writing device can write data at a position where the sensitivity of the radio wave from the radio tag is high.

Second Embodiment

Next, a second embodiment will be described.

The data writing device 1 according to the second embodiment is different from the first embodiment in that the writing position is set based on a binarized graph. Accordingly, the other portions are denoted by the same reference numerals and a detailed description thereof will be omitted.

The configuration example of the data writing device 1 according to the second embodiment is equal to that of the first embodiment and the description thereof will be omitted.

Next, the function performed by the data writing device 1 will be described. The function of the data writing device 1 is performed by executing the program stored in the internal memory or the memory 15 by the processor 111.

First, the processor 111 has a function for generating data for a graph obtained by binarizing the graph of the radio wave intensity.

The processor 111 compares the radio wave intensity of each position with a predetermined threshold value R. For example, the threshold value R is a radio wave intensity, at which data can be stably written. If the radio wave intensity is equal to or greater than the predetermined threshold value R, the processor 111 sets the value of the corresponding position to true (High). In addition, if the radio wave intensity is less than the threshold value R, the processor 111 sets the value of the corresponding position to false (Low).

Figure 9:
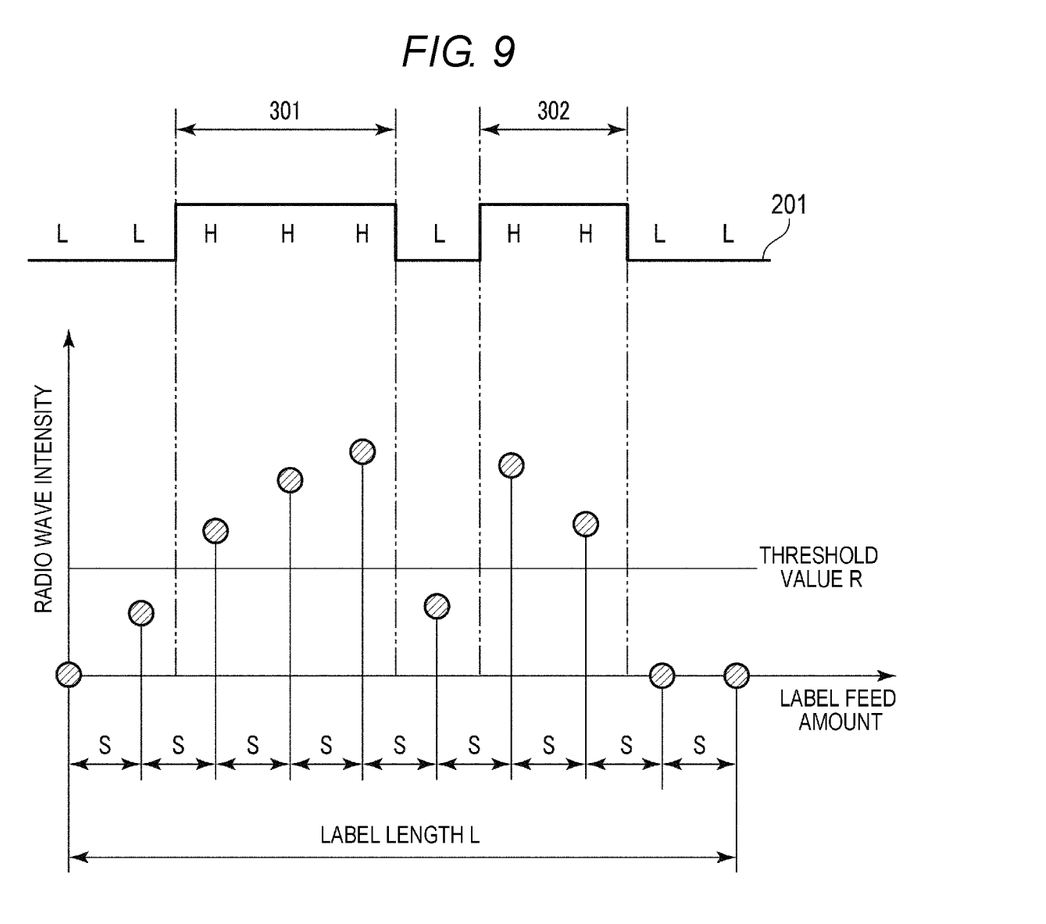
FIG. 9 is a graph showing the intensity of a radio wave from a radio tag according to a second embodiment.

FIG. 9 shows an example of the binarized graph. In FIG. 9, the graph 201 is obtained by binarizing the radio wave intensity. As shown in FIG. 9, the values of the graph 201 indicate high or true in a section where the radio wave intensity is equal to or greater than the threshold value R. In addition, the values of the graph 201 indicate low or false in a section in which the radio wave intensity is less than the threshold value R.

Here, the graph 201 has a section 301 and a section 302 as a section (true section) in which the value is true.

In addition, the processor 111 has a function for selecting the true section for setting the writing position.

First, the processor 111 determines whether a plurality of true sections are present. If one section is present, the processor 111 selects the corresponding true section.

Upon determining that the plurality of true sections are present, the processor 111 determines whether a plurality of true sections having a largest width is present. If one true section having the largest width is present, the processor 111 selects the corresponding true section.

Upon determining that the plurality of true sections having the largest width is present, the processor 111 selects a true section close to the mark 45. That is, the processor 111 selects the true section such that a conveyance distance to the writing position after detecting the label 43 becomes short.

In the example shown in FIG. 9, the processor 111 determines whether a plurality of true sections (sections 301 and 302) is present. In addition, since the section 301 is wider than the section 302, the processor 111 selects the section 301.

In addition, the processor 111 has a function for setting the central point of the selected true section to the writing position.

The processor 111 calculates the central point of the selected true section. When the central point is calculated, the processor 111 sets the calculated central point to the writing position.

In the example shown in FIG. 9, the processor 111 sets the central point of the section 301 to the writing position.

Next, the operation example of the data writing device 1 will be described.

Figure 10:
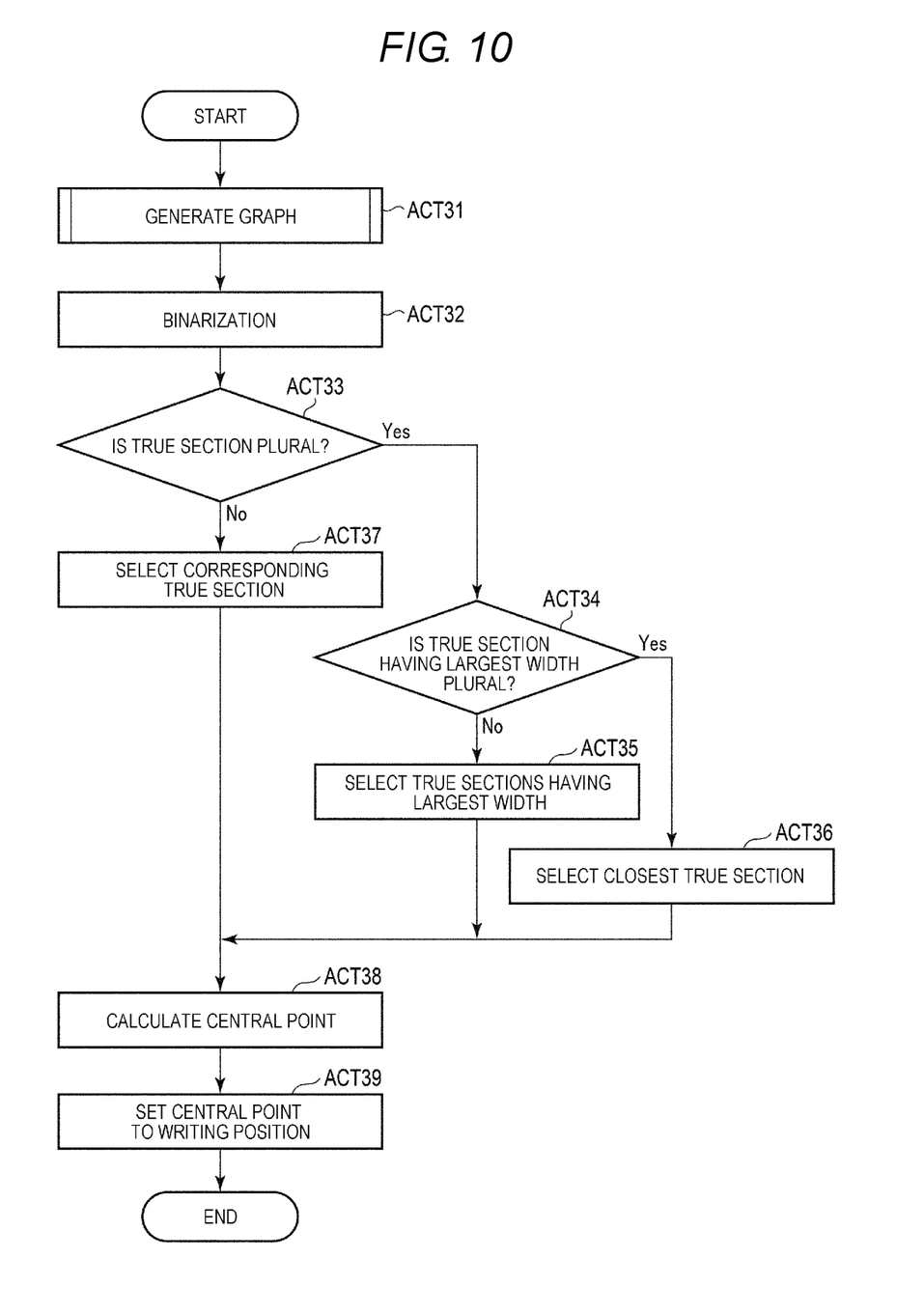
FIG. 10 is a flowchart of operation performed by a data writing device according to the second embodiment.

FIG. 10 is a flowchart illustrating the operation example of the data writing device 1.

First, the processor 111 generates the data for the graph of the radio wave intensity (ACT 31). When the data for the graph of the radio wave intensity is generated, the processor 111 binarizes the generated graph (ACT 32).

When the generated graph is binarized, the processor 111 determines whether a plurality of true sections are present (ACT 33). Upon determining that the plurality of true sections are present (ACT 33, YES), the processor 111 determines whether a plurality of true sections having a largest width is present (ACT 34).

Upon determining that one true sections having the largest width is present (ACT 34, NO), the processor 111 selects the true section having the largest width (ACT 35).

Upon determining that the plurality of true sections having the largest width is present (ACT 34, YES), the processor 111 selects a true section closest to the mark 45 (ACT 36).

Upon determining that one true sections is present (ACT 33, NO), the processor 111 selects the corresponding true section (ACT 37).

If the true section having the largest width is selected (ACT 35), if a true section closest to the mark 45 is selected (ACT 36) or if the corresponding true section is selected (ACT 37), the processor 111 calculates the central point of the selected true section (ACT 38).

When the central point of the selected true section is calculated, the processor 111 sets the calculated central point to the writing position (ACT 39). When the calculated central point is set to the writing position, the processor 111 ends the operation.

The data writing device having the above configuration sets the central point of the section of the radio wave intensity exceeding a predetermined threshold value to the writing position. As a result, the data writing device can set the writing position to a position avoiding falling of the radio wave intensity.

In addition, the data writing device sets the central point of the widest section to the writing position. As a result, the data writing device can set the writing position to a position farther from falling.

In addition, the data writing device sets the central point of the section closest to the mark showing the position of the label to the writing position. As a result, the data writing device can convey the label to the writing position by a least conveyance amount after detecting the mark.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data writing device comprising:
a roller configured to convey along a predetermined path a plurality of labels each including a radio tag;
a reader/writer configured to wirelessly communicate with a radio tag; and
a controller configured to:
control the roller to convey the labels along the predetermined path and control the reader/writer to acquire a plurality of radio wave intensities from a radio tag included in one of the labels at different positions of said one of the labels along the predetermined path as the labels are conveyed,
determine whether the acquired radio wave intensities meet a predetermined condition, wherein the predetermined condition is met when a second one of three radio wave intensities that have been consecutively acquired is less than a threshold value and a first one and a third one of the three radio wave intensities that have been consecutively acquired are equal to or greater than the threshold value, and
when the predetermined condition is met, determine a writing position for the radio tag included in said one of the labels using the position of said one of the labels corresponding to the second one of the three radio wave intensities that have been acquired.

2. The data writing device according to claim 1, wherein the controller is further configured to determine the writing position by grouping the different positions into one or more groups and selecting the writing position from one of the groups.

3. The data writing device according to claim 2, wherein the controller is further configured to select said one of the groups including a greatest number of the positions at which the radio wave intensities are equal to or greater than the threshold value.

4. The data writing device according to claim 2, wherein the controller is further configured to select said one of the groups including the position closest to a top position of said one of the labels.

5. The data writing device according to claim 1, further comprising:
a sensor configured to detect a top position of each of the labels by reading a mark on the label.

6. The data writing device according to claim 5, wherein each of the labels has a first surface where an image is printed and a second surface where the mark is indicated.

7. The data writing device according to claim 1, further comprising:
an antenna configured to emit radio waves toward the predetermined path.

8. The data writing device according to claim 7, wherein a surface of each of the labels that faces the antenna does not include an area where an image is printed.

9. A method performed by a data writing device, the method comprising:
conveying, by a roller, along a predetermined path, a plurality of labels each including a radio tag;
acquiring, by a reader/writer, a plurality of radio wave intensities from a radio tag included in one of the labels at different positions of said one of the labels along the predetermined path as the labels are conveyed;
determining whether the acquired radio wave intensities meet a predetermined condition, wherein the predetermined condition is met when a second one of three radio wave intensities that have been consecutively acquired is less than a threshold value and a first one and a third one of the three radio wave intensities that have been consecutively acquired are equal to or greater than the threshold value; and
when the predetermined condition is met, determining a writing position for the radio tag included in said one of the labels using the position of said one of the labels corresponding to the second one of the three radio wave intensities that have been acquired.

10. The method according to claim 9, further comprising:
determining the writing position by grouping the different positions into one or more groups and selecting the writing position from one of the groups.

11. The method according to claim 10, wherein the selecting comprises selecting the one of the groups including a greatest number of the positions at which the radio wave intensities are equal to or greater than the threshold value.

12. The method according to claim 10, wherein the selecting comprises selecting the one of the groups including the position closest to a top position of said one of the labels.

13. The method according to claim 9, further comprising:
detecting, by a sensor, a top position of each of the labels by reading a mark on the label.

14. The method according to claim 13, wherein each of the labels has a first surface where an image is printed and a second surface where the mark is indicated.

15. The method according to claim 11, further comprising:
emitting, by an antenna, radio waves toward the predetermined path.

16. A non-transitory computer readable medium storing a program causing a computer to execute a method of writing data into a radio tag, the method comprising:
conveying, by a roller, along a predetermined path, a plurality of labels each including a radio tag;
acquiring, by a reader/writer, a plurality of radio wave intensities from a radio tag included in one of the labels at different positions of said one of the labels along the predetermined path as the labels are conveyed;
determining whether the acquired radio wave intensities meet a predetermined condition, wherein the predetermined condition is met when a second one of three radio wave intensities that have been consecutively acquired is less than a threshold value and a first one and a third one of the three radio wave intensities that have been consecutively acquired are equal to or greater than the threshold value; and
when the predetermined condition is met, determining a writing position for the radio tag included in said one of the labels using the position of said one of the labels where the second one of the three radio wave intensities that have been acquired.

17. The computer readable medium according to claim 16, wherein the method further comprises:
determining the writing position by grouping the different positions into one or more groups and selecting the writing position from one of the groups.

18. The computer readable medium according to claim 17, wherein the selecting comprises selecting the one of the groups including a greatest number of the positions at which the radio wave intensities are equal to or greater than the threshold value.

19. The computer readable medium according to claim 17, wherein the selecting comprises selecting the one of the groups including the position closest to a top position of said one of the labels.

20. The computer readable medium according to claim 16, wherein the method further comprises:
- detecting, by a sensor, a top position of each of the labels by reading a mark on the label.

\* \* \* \* \*